United States Patent
Newell et al.

(10) Patent No.: US 10,645,464 B2
(45) Date of Patent: *May 5, 2020

(54) EYES FREE ENTERTAINMENT

(71) Applicant: DISH Network L.L.C., Englewood, CO (US)

(72) Inventors: Nicholas B. Newell, Centennial, CO (US); Sheshank Kodam, Aurora, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/254,606

(22) Filed: Jan. 23, 2019

(65) Prior Publication Data

US 2019/0191224 A1 Jun. 20, 2019

Related U.S. Application Data

(63) Continuation of application No. 15/849,431, filed on Dec. 20, 2017, now Pat. No. 10,225,621.

(51) Int. Cl.
*H04N 5/93* (2006.01)
*H04N 21/81* (2011.01)
(Continued)

(52) U.S. Cl.
CPC ..... *H04N 21/8106* (2013.01); *G06F 17/2785* (2013.01); *G06F 17/28* (2013.01);
(Continued)

(58) Field of Classification Search
CPC ............... H04N 21/8106; H04N 21/84; H04N 21/2335; H04N 21/2353; H04N 21/8547;
(Continued)

(56) References Cited

U.S. PATENT DOCUMENTS 4,931,934 A 6/1990 Snyder
5,200,893 A 4/1993 Ozawa et al.
(Continued)

OTHER PUBLICATIONS

Frechette, Casey, "10 tips for using audio more effectively in multimedia stories," Poynter, May 14, 2012; Retrieved from: https://www.poynter.org/2012/10-tips-for-using-audio-more-effectively-in-multimedia-storeis/173082/, 7 pages.
(Continued)

Primary Examiner — Robert Chevalier
(74) Attorney, Agent, or Firm — Kilpatrick Townsend & Stockton LLP

(57) ABSTRACT

Disclosed herein are systems and methods for converting audio-video content into audio-only content. Audio-video content is readily accessible, but for various reasons users often cannot consume content visually. In those circumstances, for example, when a user is interrupted during a movie to drive to pick up a spouse or child, the user may not want to forego consuming the audio-video content. The audio-video content can be converted into audio only content for the user to aurally consume, allowing the user to consume the content despite interruptions or other reasons for which the audio-video content cannot be consumed visually.

20 Claims, 10 Drawing Sheets

(51) Int. Cl.
  *G10L 15/26* (2006.01)
  *H04N 21/234* (2011.01)
  *G06F 17/28* (2006.01)
  *H04N 21/8547* (2011.01)
  *H04N 21/235* (2011.01)
  *G06F 17/27* (2006.01)
  *H04N 21/233* (2011.01)
  *H04N 21/84* (2011.01)
  *H04N 21/43* (2011.01)
  *H04N 21/2343* (2011.01)
  *H04N 9/30* (2006.01)

(52) U.S. Cl.
  CPC ....... *G10L 15/265* (2013.01); *H04N 21/2335* (2013.01); *H04N 21/2353* (2013.01); *H04N 21/23412* (2013.01); *H04N 21/23418* (2013.01); *H04N 21/234336* (2013.01); *H04N 21/4307* (2013.01); *H04N 21/84* (2013.01); *H04N 21/8547* (2013.01); *G10L 15/26* (2013.01)

(58) Field of Classification Search
  CPC .......... H04N 21/23412; G06F 17/2785; G06F 17/28; G10L 15/265
  USPC ........ 386/285, 278, 239, 248, 321, 337, 338
  See application file for complete search history.

(56) References Cited

U.S. PATENT DOCUMENTS

| | | | |
|---|---|---|---|
| 5,537,157 A | 7/1996 | Washino et al. |
| 5,572,625 A | 11/1996 | Raman et al. |
| 5,810,599 A | 9/1998 | Bishop |
| 5,884,262 A | 3/1999 | Wise et al. |
| 5,887,069 A | 3/1999 | Sakou et al. |
| 5,999,220 A | 12/1999 | Washino |
| 6,014,491 A | 1/2000 | Hair |
| 6,115,035 A | 9/2000 | Compton et al. |
| 6,184,937 B1 | 2/2001 | Williams et al. |
| 6,404,438 B1 | 6/2002 | Hatlelid et al. |
| 6,415,303 B1 | 7/2002 | Meier et al. |
| 6,483,568 B1 | 11/2002 | Folio |
| 6,499,027 B1 | 12/2002 | Weinberger |
| 6,539,269 B1 | 3/2003 | Jarrow et al. |
| RE38,079 E | 4/2003 | Washino et al. |
| 6,598,020 B1 | 7/2003 | Kleindienst et al. |
| 6,647,119 B1 | 11/2003 | Slezak |
| 6,785,539 B2 | 8/2004 | Hale et al. |
| 6,820,055 B2 | 11/2004 | Saindon et al. |
| 6,853,385 B1 | 2/2005 | MacInnis et al. |
| 6,865,533 B2 | 3/2005 | Addison et al. |
| 6,876,728 B2 | 4/2005 | Kredo et al. |
| 6,968,364 B1 | 11/2005 | Wong et al. |
| 6,981,207 B1 | 12/2005 | Bakman et al. |
| 7,035,804 B2 | 4/2006 | Saindon et al. |
| 7,039,643 B2 | 5/2006 | Sena et al. |
| 7,062,437 B2 | 6/2006 | Kovales et al. |
| 7,103,548 B2 | 9/2006 | Squibbs et al. |
| 7,340,393 B2 | 3/2008 | Mitsuyoshi |
| 7,356,470 B2 | 4/2008 | Roth et al. |
| 7,434,176 B1 | 10/2008 | Froloff |
| 7,536,706 B1 | 5/2009 | Sezan et al. |
| 7,921,036 B1 | 4/2011 | Sharma et al. |
| 7,983,910 B2 | 7/2011 | Subramanian et al. |
| 7,999,857 B2 | 8/2011 | Bunn et al. |
| 8,209,182 B2 | 6/2012 | Narayanan |
| 8,224,652 B2 | 7/2012 | Wang et al. |
| 8,605,141 B2 | 12/2013 | Dialameh et al. |
| 8,825,187 B1 | 9/2014 | Hamrick et al. |
| 2002/0136531 A1 | 9/2002 | Harradine et al. |
| 2002/0191757 A1 | 12/2002 | Belrose |
| 2002/0194006 A1 | 12/2002 | Challapali |
| 2003/0028380 A1 | 2/2003 | Freeland et al. |
| 2003/0069936 A1 | 4/2003 | Warner et al. |
| 2003/0110450 A1 | 6/2003 | Sakai |
| 2003/0163320 A1 | 8/2003 | Yamazaki et al. |
| 2004/0111271 A1 | 6/2004 | Tischer |
| 2004/0221323 A1 | 11/2004 | Watt |
| 2005/0099291 A1 | 5/2005 | Landau |
| 2005/0276572 A1 | 12/2005 | Boswell et al. |
| 2006/0010240 A1 | 1/2006 | Chuah |
| 2006/0227945 A1 | 10/2006 | Runge et al. |
| 2007/0022215 A1 | 1/2007 | Singer et al. |
| 2007/0071206 A1 | 3/2007 | Gainsboro et al. |
| 2007/0265507 A1 | 11/2007 | de Lemos |
| 2007/0288715 A1 | 12/2007 | Boswell et al. |
| 2008/0013859 A1 | 1/2008 | Cohen et al. |
| 2008/0027984 A1 | 1/2008 | Perdomo et al. |
| 2008/0056145 A1 | 3/2008 | Woodworth |
| 2008/0114481 A1 | 5/2008 | Braithwaite et al. |
| 2008/0163074 A1 | 7/2008 | Tu |
| 2008/0306925 A1 | 12/2008 | Campbell et al. |
| 2009/0037243 A1 | 2/2009 | Cohen et al. |
| 2009/0063154 A1 | 3/2009 | Gusikhin et al. |
| 2009/0138507 A1 | 5/2009 | Burckart et al. |
| 2010/0049525 A1 | 2/2010 | Paden |
| 2010/0121629 A1 | 5/2010 | Cohen |
| 2010/0159891 A1 | 6/2010 | Sigmund et al. |
| 2010/0241963 A1 | 9/2010 | Kulis et al. |
| 2010/0262597 A1 | 10/2010 | Han |
| 2011/0040155 A1 | 2/2011 | Guzak et al. |
| 2011/0238406 A1 | 9/2011 | Chen et al. |
| 2011/0286584 A1 | 11/2011 | Angel et al. |
| 2012/0236201 A1 | 9/2012 | Larsen et al. |
| 2012/0276504 A1 | 11/2012 | Chen et al. |
| 2013/0124984 A1 | 5/2013 | Kuspa |
| 2013/0293577 A1 | 11/2013 | Perez et al. |
| 2014/0173051 A1* | 6/2014 | Sagayaraj ............... H04W 4/18 709/219 |
| 2014/0298364 A1 | 10/2014 | Stepanov et al. |
| 2015/0172238 A1 | 6/2015 | Ahmed et al. |

OTHER PUBLICATIONS

Cosatto, et al., "Photo-Realistic Talking-Heads from Image Samples," IEEE Transactions on Multimedia, vol. 2, No. 3, Sep. 2000, 13 pages.
Free Video to Audio Converter 2016; Retrieved from: http://download.cnet.com/Free-Video-to-Audio-Converter-2016/3000-2140_4-10909427, 4 pages.
U.S. Appl. No. 15/849,431 filed Dec. 20, 2017 Notice of Allowance dated Oct. 24, 2018, all pages.

\* cited by examiner

EYES FREE ENTERTAINMENT

CROSS-REFERENCE TO RELATED APPLICATIONS

The present application is a continuation of U.S. patent application Ser. No. 15/849,431, filed on Dec. 20, 2017, which is hereby incorporated by reference in its entirety for all purposes.

BACKGROUND

Entertainment and information on-the-go has become an expectation of many consumers. However, while driving during a commute or other travel, consumers cannot safely utilize visual content such as television shows, news broadcasts, or movies. Additionally, visually-impaired individuals suffer from a lack of readily available content that would normally or otherwise consumed visually. Much of this content such as movies or television shows can be consumed aurally, but much of the content is missed if not viewed. Some movie theaters are equipped with equipment for visually or hearing impaired individuals, but this does not provide the extensively available entertainment and information content readily available, nor does it provide an on-the-go solution for commuters and other travelers. Accordingly, improvements are needed.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for converting audio-video content into audio-only content. The method can include decomposing the audio-video content into frames and a sound component. The method can also include creating an object layer by, for each frame, decomposing the frame into one or more visual objects in the frame. Creating an object layer can also include, for each frame, generating a description of each of the one or more visual objects in the frame to create object descriptions for each visual object in the frame. Creating an object layer can also include generating an object layer audio component based on the object descriptions. The method can also include creating a sound layer by generating a sound layer audio component from the sound component. The method can also include creating a motion layer by analyzing, by the computer system, each frame in the plurality of frames to identify motion between consecutive frames. The method also includes generating, by the computer system, a motion layer audio component based on a description of the motion between consecutive frames. The method also includes generating, by the computer system, an audio only output of the audio-video content based on the object layer audio component, the sound layer audio component, and the motion layer audio component. The method also includes transmitting, by the computer system, the audio only output to a device of a user. Other embodiments of this aspect include corresponding computer systems, apparatus, and computer programs recorded on one or more computer storage devices, each configured to perform the actions of the methods.

Implementations may include one or more of the following features. Optionally, the object layer generation can include associating source time codes with the object layer audio component. Optionally, creating the sound layer can include associating the source time codes with the sound layer audio component. Optionally, creating the motion layer can include associating the source time codes with the motion layer audio component. Optionally, generating the audio only output is further based on the source time codes. Optionally, creating the object layer can include identifying the visual objects using a catalog of object templates. Optionally, creating the object layer can include, for each frame, analyzing the acuteness of each of the visual objects in the frame, assigning a relative acuteness to each of the visual objects in the frame, and identifying focal point objects based on the relative acuteness of each of the visual objects in the frame. Optionally, the object descriptions can include a more detailed description of focal point objects than of background objects. Optionally, the type of the visual object can be identified for each of the visual objects in the frame and an analysis template that defines attributes of the visual object can be selected. Optionally, the attribute values for the attributes of the visual object can be used to describe the visual object. Optionally, the frames can be grouped into scenes. Optionally, the object descriptions associated with each of the scenes can be converted into an audio only message for each scene. Optionally, the audio only messages for each scene can be used to generate the object layer audio component. Optionally, the language of speech in the sound component can be identified and the speech can be converted into text in that language. Optionally, attributes can be assigned to each word in the text. Optionally, an emotion can be assigned to each word based on comparing the attributes for each word to language specific audio templates. Optionally, the text can be converted to a second language text. Optionally, the second language text can be used to generate the sound layer audio component based on the emotion assigned to each word. Optionally, for each of the one or more visual objects within each frame, the visual object within a frame can be located in the frame and a consecutive frame, and the locations can be compared to identify motion. Optionally, the type of motion can be determined based on background objects in the frames. Optionally, types of the motion can include object motion, camera motion, and editing motion. Optionally, the motion can be identified in scenes by grouping the frames into scenes. Optionally, an audio description of motion in each scene based on motion of each visual object within the scene can be generated. Optionally, a mart language algorithm and natural language processing can be used to format each scene, using the associated portion of the object layer audio component, the associated portion of the sound layer audio component, and the associated portion of the motion layer audio component into human-understandable sentences. Optionally, the user device can detect when the user has moved a sufficiently far distance or for a sufficiently long time and automatically request conversion of audio-video content to be provided to the user during his or her travel. Implementations of the described techniques may include hardware, a method or process, or computer software on a computer-accessible medium.

DETAILED DESCRIPTION

Figure 1:
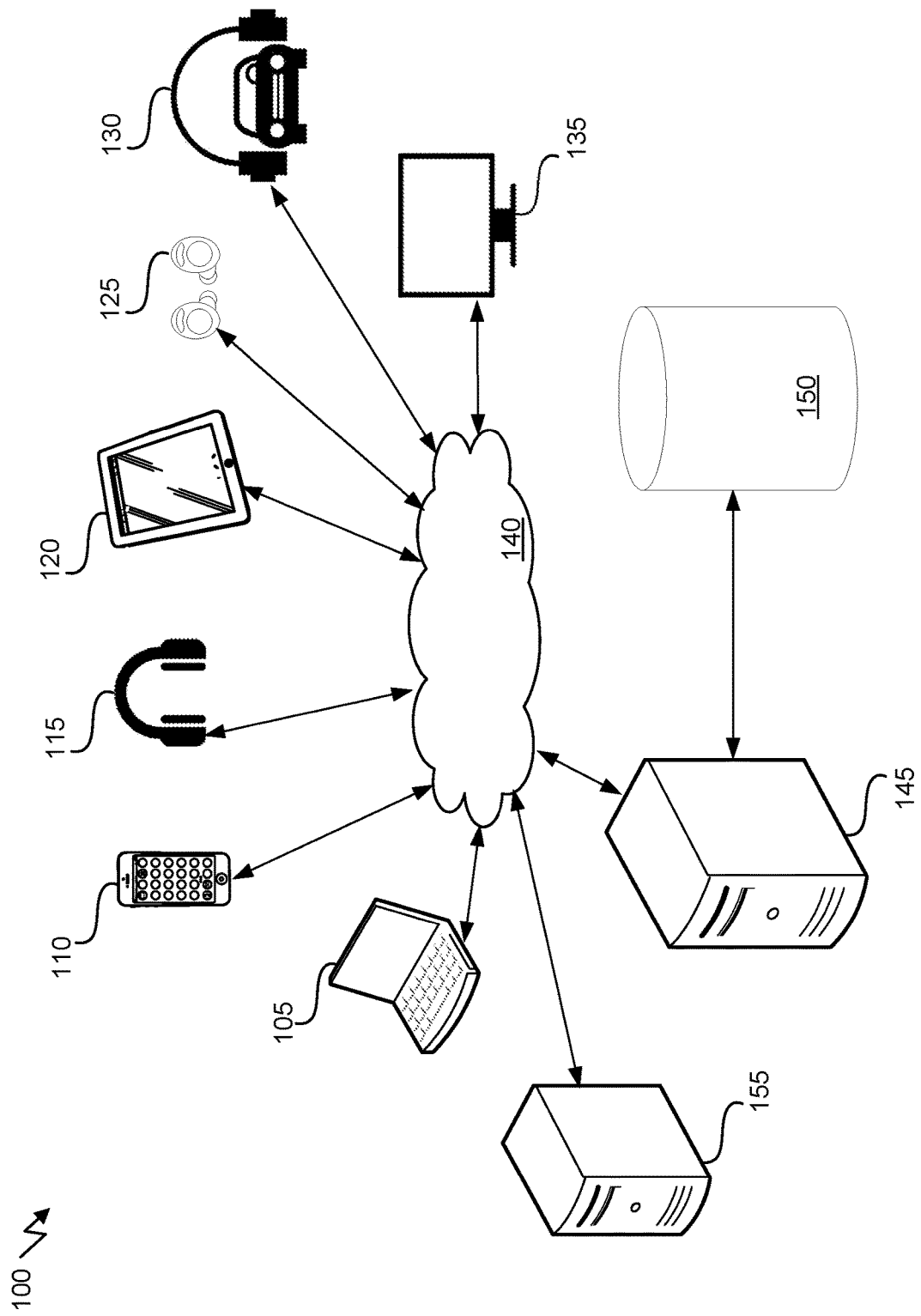
FIG. 1 illustrates an exemplary system for providing eyes-free entertainment and information.

Entertainment, educational, and informational content is often provided in an audio-video format. As such, users often need to view the video portion and hear the audio portion of the audio-video content to obtain the full benefit of the content. For example, without viewing the video portion of the content, the user may miss key information. Likewise, without hearing the audio portion of the content, the user may miss key information. As a specific example, envision an audio-video clip of a crocodile crawling near a swampy area full of tall grass. The audio portion of the audio-video clip can provide key information that may be missed if the user does not hear the audio content. For example, a narrator may be explaining that the crocodile is scavenging for food for its baby. As a second example, ominous music may be playing, suggesting the crocodile is dangerous and/or hunting. But the tone of the clip may be completely different if, in a third example, love songs are playing, suggesting the crocodile is looking for a mate. There are countless other examples to show that the audio portion of an audio-video clip can set the tone of the audio-video content or provide other key information.

Similarly, the video portion of audio-video content can provide key information that may be missed if the user does not view the video. As a specific example, envision an audio-video clip of a thief stealing a piece of art from a museum after hours. If consuming only the audio portion of the clip, the user may hear suspenseful music, but there is typically no narration of the visual content, so a user would not know what was happening.

Conversion of audio-video content, as can be recognized from the examples above, is insufficient if the audio portion of the content is merely stripped out and provided as audio only content. The key information obtained from the video portion of the content remains missing if only the audio portion of the content is used. The generation of audio content that describes the video portion of the audio content is needed.

Embodiments include obtaining audio-video content and decomposing the audio-video content into frames and a sound component. The frames and sound component can be used to generate three layers—an object layer, a sound layer, and a motion layer. The object layer can be used to generate an object audio component that includes an audio description of each object in each frame of the audio-video content. Optionally, the object audio component can include an audio description of some portion of the objects in each frame or some of the frames. The sound layer can be used to generating a sound layer audio component from the sound component. Optionally, the sound layer audio component can be the audio portion of the audio-video content. The motion layer can be used to generate a motion layer audio component that includes a description of the motion between consecutive frames. An audio only output of the audio-video content can then be generated based on the object layer audio component, the sound layer audio component, and the motion layer audio component. The audio only output can be transmitted to a device of a user, allowing the user to consume the key information contained in the video portion of the audio-video content in an audio format.

Countless use cases for this functionality exist. For example, Hussain is watching the movie "CREED" with Hindi sub-titles when he gets a call from his wife who needs a ride from the airport. He can listen to the remainder of the movie in his native language that has been converted from audio-video content to audio only content in Hindi while he drives to the airport, and he is able to thoroughly enjoy the movie because he still experiences every punch, tear, and laugh. Because Hussain consumed the audio only content during his drive, he has an hour when he gets back home to spend with his wife, and he was still able to fully experience the movie.

As another example, Molly goes for a jog with her dog every evening at approximately 5 pm. When Molly heads out each evening, the application enabling the functionality described herein executing on her smartphone detects her motion and, based on previous patterns, picks up the movie she left off on yesterday, begins a new movie, or provides the 5 o'clock news converted to audio only content.

While audio-video content is generally discussed herein as movies or entertainment content, any audio-video content can be converted to audio only content using the systems and methods disclosed herein. Various types of multi-media content can be created and can be included herein as audio-video content. For example, television programs, independent or studio sourced movies, home videos, movie reviews, news programming, documentaries, video clips captured on smartphones, tablets, or other mobile devices, and so forth.

FIG. 1 illustrates an exemplary high level diagram of a system 100 for providing eyes free entertainment and information. The system 100 can include user devices including a laptop 105, a mobile phone 110, headphones 115, a tablet 120, in-ear phones 125, and a vehicle stereo 130. The system 100 can also include viewing device 135, a network 140, a server 145, storage device 150, and content provider 155.

The user devices depicted in system 100 are examples of user devices. Laptop 105 can be any suitable laptop with audio and networking capabilities. Mobile phone 110 can be any suitable smartphone with audio and networking capabilities. Headphones 115 can be wireless headphones that have the capability to download and/or stream audio content via network 140. Tablet 120 can be any suitable tablet with audio and networking capabilities. In-ear phones 125 can be any in-ear wireless headphones that have the capability to download and/or stream audio content via network 140. Vehicle stereo 130 can be any portable stereo, whether in a vehicle or not, capable of downloading and/or streaming audio content via network 140. Though only one of each user device is depicted, any number of each of the user devices depicted can be included in system 100. Further, other types of user devices, though not depicted, can be included in system 100. For example, a smartwatch, a wireless voice-controlled speaker (e.g., Amazon Echo® or Google Home®), or any other suitable device with audio capability and the capability to download and/or stream audio content via network 140.

Viewing device 135 can be any suitable device that includes processing components for receiving and/or storing audio-video content, processing components for rendering the video portion of the audio-video content, a speaker to output the audio portion of the audio-video content, and a display device for viewing the video portion of the audio-video content. For example, a television and the television receiver to which it is coupled can be a viewing device 135. Other examples include a smartphone, a tablet, a laptop, a computer system, and a digital video recorder with the display device to which it is coupled.

Network 140 can be can be any type of network including the Internet, a local area network ("LAN"), a wide area network ("WAN"), a virtual network, a cloud network, or a telecommunications network. Network 140 can be implemented as a wired network and/or wireless network. Network 140 can be any suitable network for allowing communication between one or more user devices and server 145 and between server 145 and viewing device 135.

Figure 11:
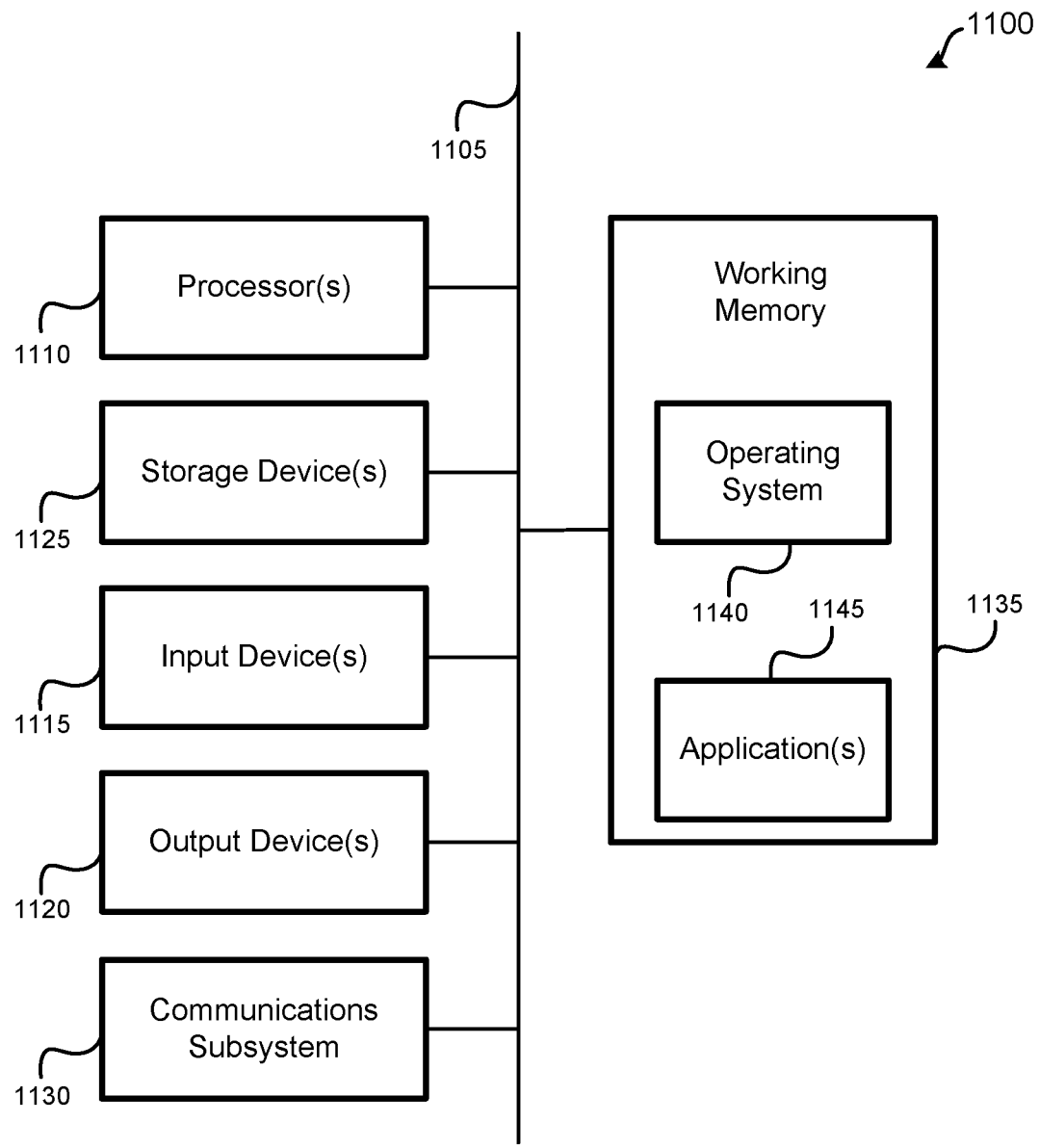
FIG. 11 illustrates an exemplary computer system.

Server 145 can be any suitable computer system, such as the computer system 1100 of FIG. 11, that has components and processing capability to facilitate communication over network 140, components and processing capability to facilitate communication with storage device 150, and processing capability to process audio-video content into audio only content as described in detail herein.

Storage device 150 can be, for example, storage device 1125 of FIG. 11. Storage device 150 can be communicatively coupled to server 145. Optionally, storage device 150 can be a storage device housed within server 145. Optionally, storage device 150 can be a part of network storage, cloud storage, or any other suitable storage accessible by server 145.

Content provider 155 can be any suitable content provider, such as for example, a television service provider, a movie service provider, or any other content provider. The content provider 155 can provide audio-video content for conversion to audio only content. Optionally, the server 145 providing the conversion functionality can be part of content provider 155.

In use, a user of viewing device 135 can desire that the audio-video content he is currently or wants to consume be converted from audio-video content to audio only content. A request to convert the audio-video content can be sent via network 140 to server 145. Server 145 can check storage device 150 for an already converted audio only content of the audio-video content. If server 145 finds audio only content of the desired audio-video content, server 145 can provide the audio only content to the user device or the viewing device 135 for the user to consume aurally. Optionally, the user can provide the output location (e.g., laptop 105, mobile phone 110, headphones 115, tablet 120, in-ear phones 125, vehicle stereo 130, or viewing device 135) with the request. Optionally, server 145 can send the audio only content to the destination device for download or as a stream.

If server 145 does not find audio only content of the desired audio-video content, server 145 can convert the audio-video content to audio only content as described in more detail herein. Optionally, server 145 can authenticate the user with content provider 155 before providing audio only content to the user to ensure that the user has the requisite authentication to obtain the content. Optionally, server 145 can obtain the audio-video content from content provider 155 for converting it to audio only content. Server 145 can then optionally save the audio only content in storage device 150. Server 145 can transmit the audio only content to the destination device for the user to consume aurally.

Figure 2:
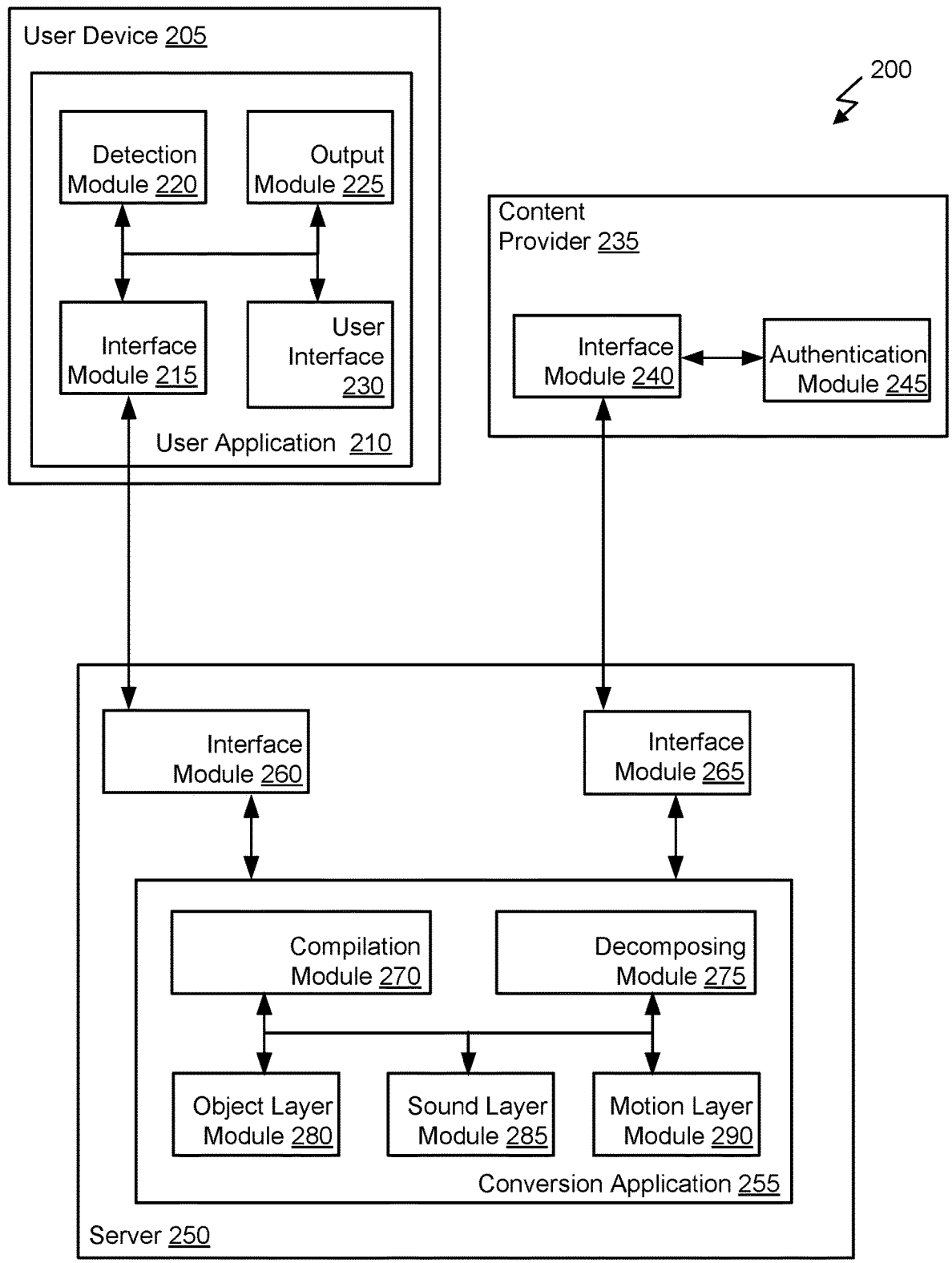
FIG. 2 illustrates an exemplary block diagram for providing eyes-free entertainment and information.

FIG. 2 illustrates a simplified block diagram of a system 200 for providing eyes free entertainment or information. System 200 can be at least a portion of system 100. System 200 can include a user device 205, a content provider 235, and a server 250. Each of the components of system 200 include multiple interfaces and/or modules. While shown in the various modules, the functionality of one or more modules and/or interfaces can be divided into additional modules and/or combined into fewer modules and still be within the scope of the disclosure herein. Further, converting the audio-video content into audio only content is described as functionality of the server 250, but the functionality can be provided by user device 205 such that server 250 need not be included in system 200 without changing the scope of the disclosure herein.

User device 205 can be, for example, any of the user devices described with respect to FIG. 1. For example, user device 205 can be laptop 105, mobile phone 110, headphones 115, tablet 120, in-ear phones 125, vehicle stereo 130, and/or any other suitable user device as described with respect to FIG. 1. User device 205 can include user application 210. User application 210 can include interface module 215, detection module 220, output module 225, and user interface 230.

Interface module 215 can provide an interface for the user application 210 on user device 205 to communicate with interface module 260 on server 250. Detection module 220 can detect that the user may want to consume audio only content (e.g., based on detecting motion of the user of more than a threshold distance or time) and instantiate the request for audio only content for the user of user device 205. Output module 225 can output the audio only content to a speaker of the user device 205. User interface 230 can provide a user interface for the user to interact with user application 210. The user interface 230 can allow the user to select various settings, such as, the threshold distance or time for the user to be moving before the detection module 220 initiates the request for audio only content. User interface 230 can also allow the user to select whether the user should be prompted or if the initiation of the request should automatically start without user input. The user interface 230 can also allow the user to select audio-video content that is desired for consumption. Each of the interface module 215, detection module 220, output module 225, and user interface 230 can communicate with each other.

Content provider 235 can be any suitable content provider such as content provider 155 described with respect to FIG. 1. Content provider 235 can include interface module 240 and authentication module 245. Interface module 240 can allow content provider 235 to communicate with server 250 via interface module 265. Authentication module 245 can provide authentication services to confirm the user of user device 205 has access to the audio-video content that is desired to be converted to audio only content.

Server 250 includes interface module 260, interface module 265, and conversion application 255. The interface module 260 allows communication with interface module 215 of user application 210. Interface module 265 allows communication with interface module 240 of content provider 235. Conversion application 255 includes compilation module 270, decomposing module 275, object layer module 280, sound layer module 285, and motion layer module 290.

In use, the detection module 220 can detect that the user has walked, for example, 200 ft, which can exceed a motion threshold. The detection module 220 can check a settings database (not shown) for determining whether the user wants to be prompted or whether the detection module 220 should launch a request without user input. If detection module 220 determines it should prompt the user, it can send a request to user interface 230 to prompt the user for input to determine whether the user wants to consume audio only content and which content to convert. Alternatively, the detection module 220 can determine it should not prompt the user and can also find in the settings database whether there is preferred content, either that is new or that was previously partially consumed. Upon determining that there is new content to consume, detection module 220 can send a request to interface module 215 to get the content converted by server 250.

Interface module 215 can communicate the request to interface module 260. Interface module 260 can provide the request to conversion application 255. Conversion application 255 can determine it needs to obtain the content from content provider 235, and send the request for content to interface module 265. Interface module 265 can send the request to interface module 240. Interface module can send the request to authentication module 245, which can authenticate the user with credentials provided in the request, for example. The result of authentication can be returned to interface module 240. If successful, interface module 240 can access a content database (not shown) and provide the content to interface module 265. If not successful, interface module 240 can send a decline message to interface module 265.

Once received, interface module 265 can provide the content to conversion application 255. Decomposing module 275 can receive the audio-video content and decompose it into a sound component and frames. The sound component and frames can be provided to the other modules in conversion application 255.

The object layer module 280 can use the frames and identify the objects with each of the frames. Once identified, the object layer module can use templates, for example, to describe the objects and generate an object layer audio component that describes the objects. Timestamps from the decomposed content can be inserted into the object layer audio component.

The sound layer module 285 can convert the sound component into a different language, if desired. For example, the sound layer module 285 can identify spoken words or other verbal components of the sound component. The spoken words can be assigned emotional values and converted to text. The text can then be translated to a different language and natural language processing can be used to convert the translated text using the emotional values to a sound layer audio component. Timestamps from the decomposed content can be inserted into the sound layer audio component.

The motion layer module 290 can identify motion between frames, identify the type of the motion, and describe the motion in a motion layer audio component. Timestamps from the decomposed content can be inserted into the motion layer audio component.

The compilation module 270 can use the motion layer audio component, the sound layer audio component, and the object layer audio component to compile an audio only content of the original audio-video content. For example, the timestamps within each component can be used to match up the object descriptions, the sound portion, and the motion being described in each component. The compilation module 270 can provide the compiled audio only content to interface module 260.

Interface module 260 can provide the audio only content to interface module 215. Interface module 215 can provide the audio only content to output module 225. Output module 225 can output the audio only content to the appropriate output component of the user device 205. For example, output module 225 can provide the audio only content through speakers in user device 205.

Figure 3:
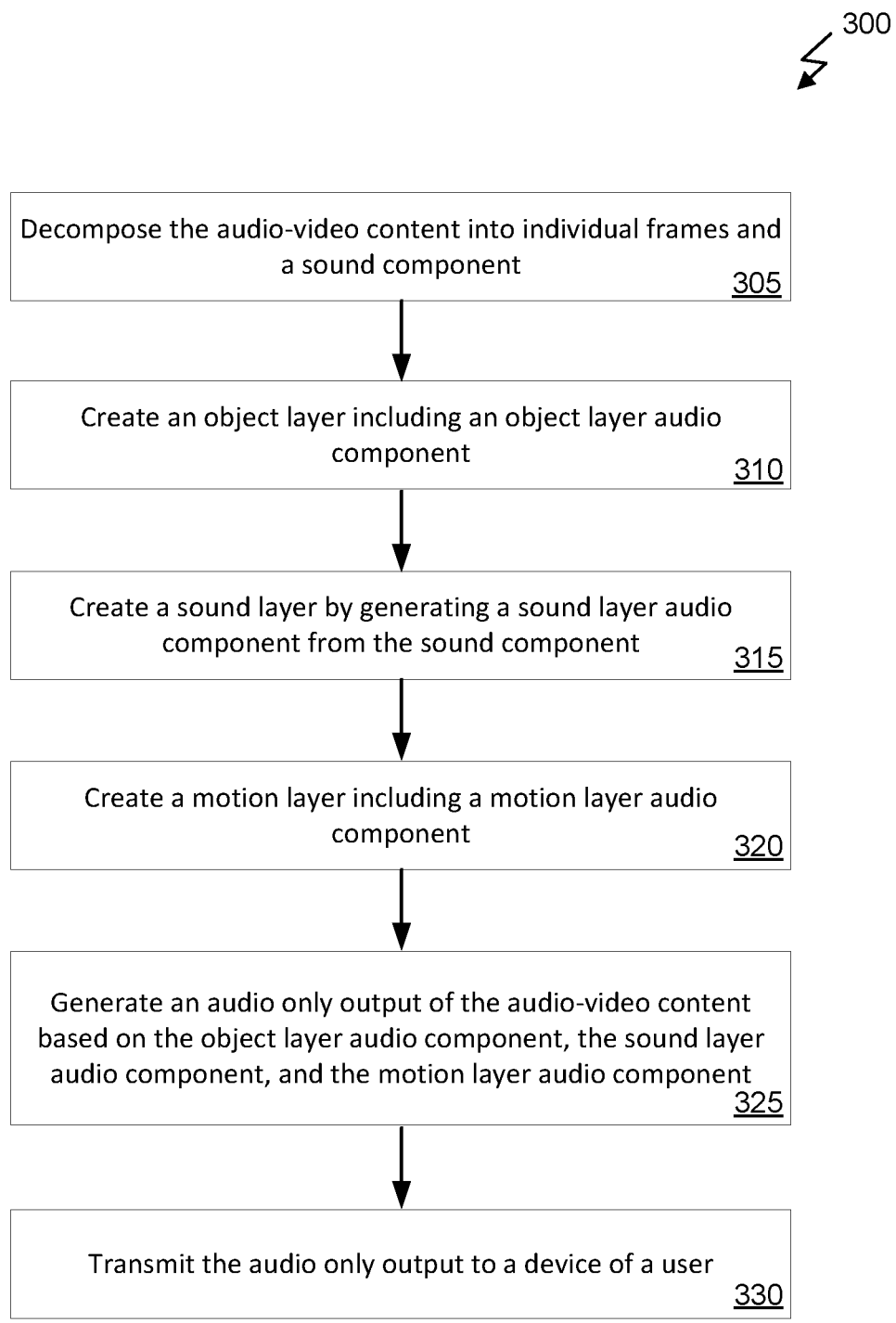
FIG. 3 illustrates an exemplary method for providing eyes-free entertainment and information.

FIG. 3 illustrates a method 300 for converting audio-video content to audio only content. Method 300 can be performed, for example, by server 250 of FIG. 2. Method 300 can begin at 305 with decomposing the audio-video content into individual frames and a sound component. For example, the audio portion of the audio-video content can be separated and can be the sound component. The video portion of the audio-video content can be decomposed into individual frames.

At 310, the server can create an object layer, including an object layer audio component. For example, once the content is decomposed into frames, the objects from each frame can be identified and described to create an object layer audio component. The object layer can include each of the objects or some portion of the objects from each frame or some portion of the frames. Object templates can be used to generate a description of the objects to create the object layer audio component. Various details of the object layer generation are described in further detail in FIGS. 4, 6, and 7.

At 315, the server can create a sound layer by generating a sound layer audio component from the sound component. The sound component can be the audio portion of the audio-video content. The audio portion can be deconstructed into spoken words/speech, music, and/or other noises. The speech portion can be analyzed to assign emotion and other attributes to the words. The words can be converted to text. Optionally, the text can be translated to another language. The translated text can then be converted to audio in the new language, using the attributes and emotions identified for each of the words. Timestamps can be used to correlate the speech portion of the audio portion with the other noises and/or music. The translated speech (if translation was done) can be merged with the other noises and music using the timestamps to generate the sound layer audio component.

At 320, the server can create a motion layer including a motion layer audio component. The frames of the audio-video content can be analyzed to identify motion between frames. For example, if an object is in one location in a first frame but in a second location in the next frame, the object may be in motion. Motion can be due to camera motion, object motion, or editing motion. The server can determine the type of motion and using the type of motion and information about the object that may be moving to generate a description of the motion in a motion layer audio component.

At 325, the server can generate an audio only output of the audio-video content based on the object layer audio component, the sound layer audio component, and the motion layer audio component. For example, each of the components can include timestamps from the original audio-video content that can allow the three components to be correlated so that the description of objects can match up to where the motion description of objects and audio portions of the audio-video content are.

At 330, the server can transmit the audio only output to a device of a user. Optionally, the audio only content can be streamed to the device. Optionally, the audio only content can be provided for download to the user device.

Figure 4:
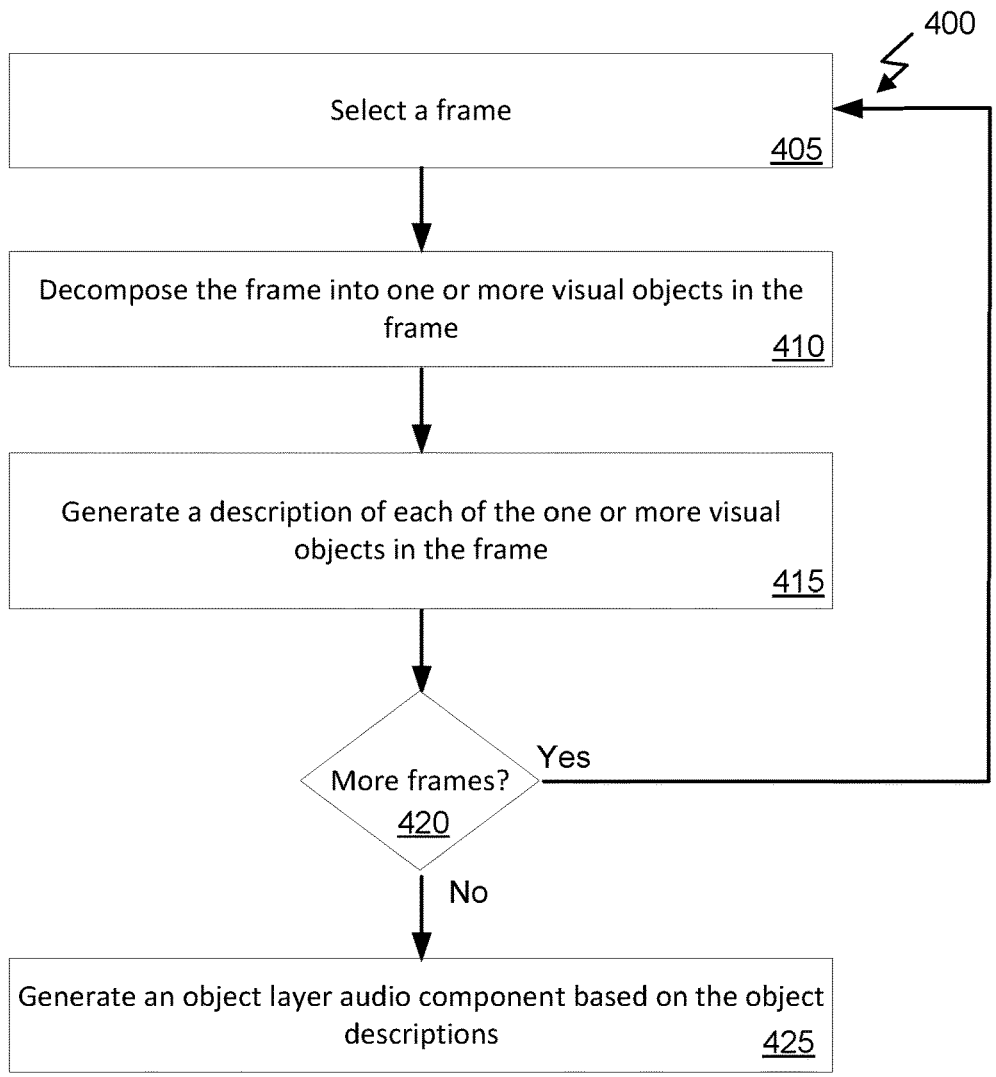
FIG. 4 illustrates an exemplary method for generating an audio description of the visual objects in video content.

FIG. 4 illustrates a method 400 for generating an object layer audio component. Method 400 can provide more detail of step 310 of FIG. 3. Method 400 can be performed by, for example, server 250 of FIG. 2. Method 400 can begin at 405 with the server selecting a frame from the decomposed audio-video content. At 410, the server can decompose the frame into one or more visual objects in the frame. Optionally, every object in the frame can be identified. Optionally, only focal point objects can be identified. At 415, the server can generate a description of each of the visual objects identified. For example, attributes such as color, size, shape, and so forth can be generated. A library of object templates can be used to identify the attributes that should be identified for the object. Then, based on the object template, a description of the object can be created. The description can be audio format or text format that is later converted to audio format.

At 420, the server can determine whether there are more frames to analyze. If so, the steps 405, 410, and 415 can be performed for each frame until each of the objects identified in each of the frames is described. The server can detect for subsequent frames when an object appeared in a previous frame to avoid re-describing the object multiple times. Once the server determines there are no more frames to analyze, the server can generate an object layer audio component based on the object descriptions at step 425. For example, the object descriptions can be stitched together in time sequence to generate the object layer audio component. Timestamps correlating the object layer audio component with the frames can be inserted into the object layer audio component to facilitate combining the sound layer audio component and the motion layer audio component with the object layer audio component.

Figure 5:
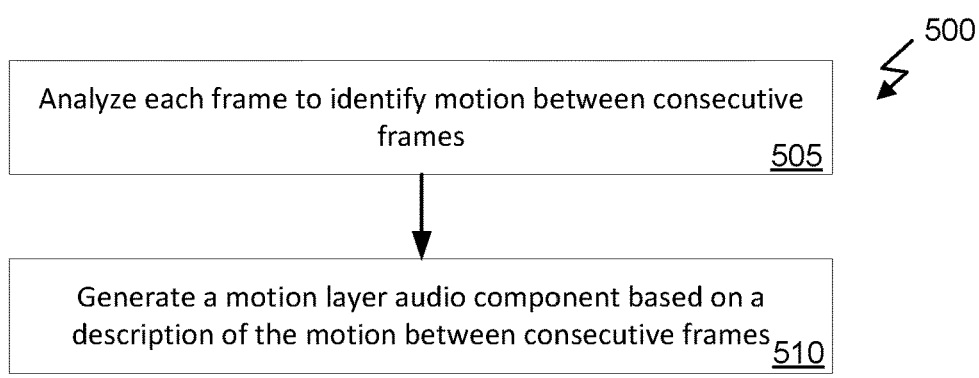
FIG. 5 illustrates an exemplary method for generating an audio description of motion in video content.

FIG. 5 illustrates a method 500 for generating a motion layer audio component. Method 500 can provide more detail of step 320 of FIG. 3. Method 500 can be performed by, for example, server 250 of FIG. 2. Method 500 can begin at 505 with the server analyzing each frame of the decomposed audio-video content to identify motion between consecutive frames. The motion can be described between frames by identifying the beginning of the motion and the end of the motion. For example, it may take 5 frames before the motion stops, and the server can identify that the motion begins at a first frame and ends at the fifth frame by analyzing each frame consecutively until it reaches a frame in which the motion does not occur from the last frame. Once the beginning and ending of the motion is identified, the motion can be described using description templates. After identifying and describing the motion in all the frames, the descriptions can be combined to generate a motion layer audio component. The motion layer audio component can include timestamps correlating the motion with the associated frames to facilitate combining the sound layer audio component and the object layer audio component with the motion layer audio component.

Figure 6:
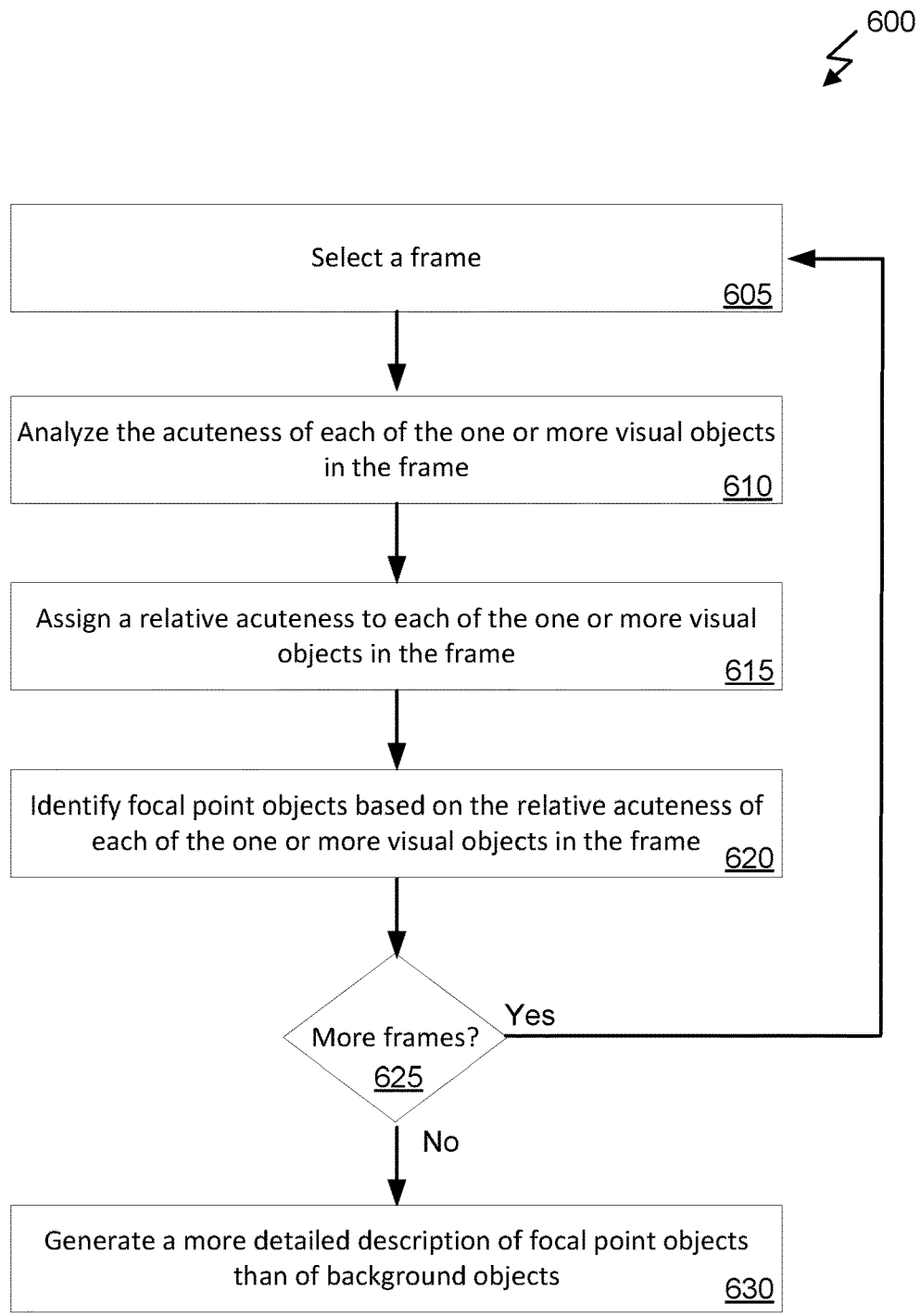
FIG. 6 illustrates an exemplary method for identifying focal objects and generating an audio description of the visual objects in video content based on focal objects.

FIG. 6 illustrates a method 600 for generating more detailed descriptions of focal objects than background objects. Method 600 can be performed by, for example, server 250 of FIG. 2. Method 600 can provide additional detail to step 310 of FIG. 3 and can be performed in addition to or instead of method 400 of FIG. 4. Method 600 can begin with the server selecting a frame of the decomposed audio-video content at 605. At 610, the server can analyze the acuteness of each of the visual objects in the frame. For example, focal objects can be more clearly defined (e.g., not blurry) than background objects. At 615, the server can assign a relative acuteness to each of the one visual objects in the frame. For example, a focal point object that is not blurry can have a score of 5 while a blurry or fuzzy background object can have a score of 1. Any scoring system can be used. The consistency of the scoring system across the frames can ensure that the focal objects are consistently described in more detail. At 620, the server can identify focal point objects based on the relative acuteness scores assigned to each of the visual objects in the frame. At 625, the server can determine whether additional frames need to be analyzed. If so, the server can perform each of steps 605, 610, 615, and 620 for each frame until they are all analyzed. When no additional frames exist, at 630, the server can generate a more detailed description of focal point objects than of background objects. Optionally, background objects can be not described at all. Settings of the user can determine the detail to which the user would like descriptions of objects created. For example, the user interface 230 of FIG. 2 can be used by a user to select how detailed the descriptions of motion and/or objects should be including whether to describe background objects, whether every object should be described, and so forth. The more detail the user requests, the longer the audio only content will usually be.

Figure 7:
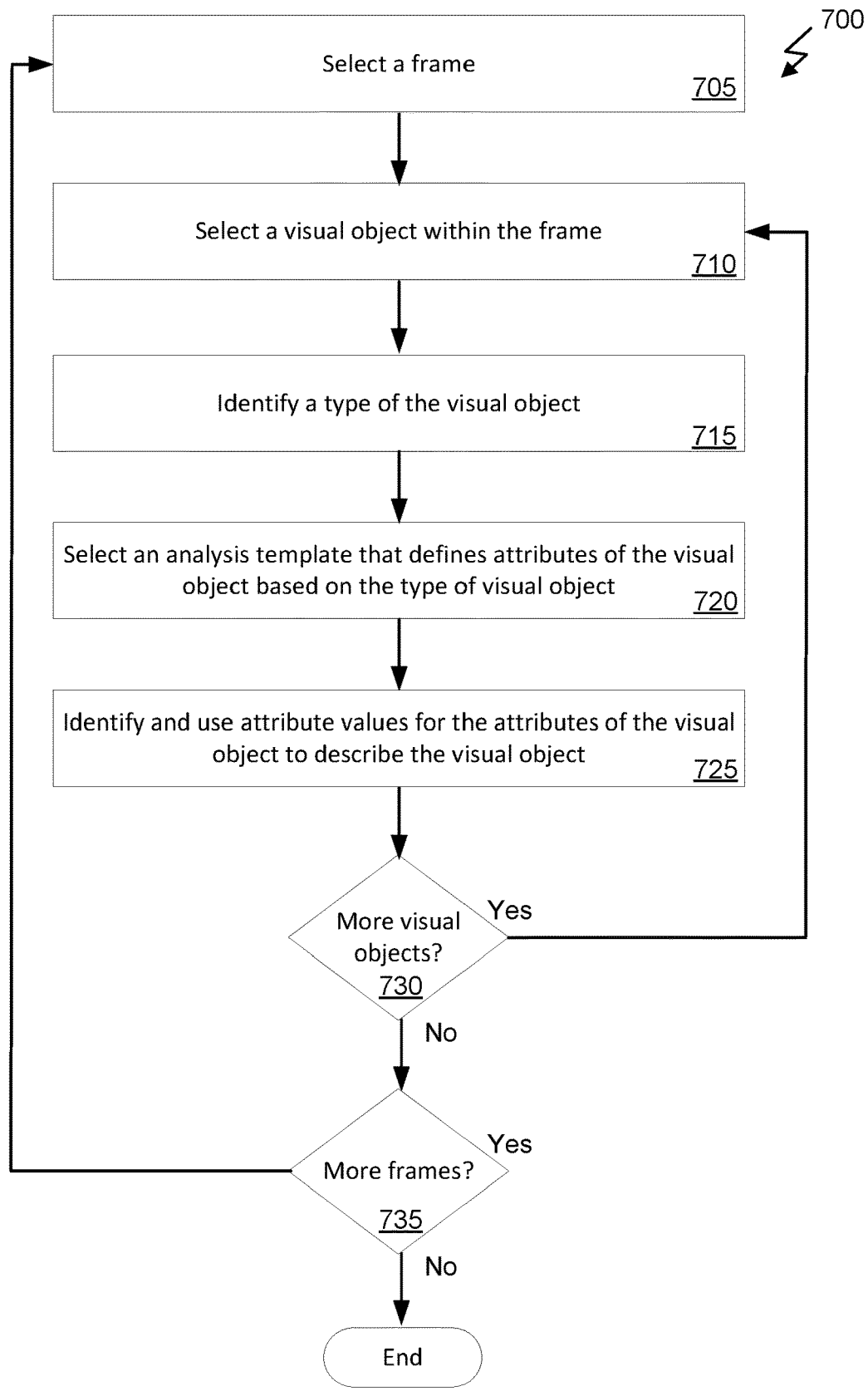
FIG. 7 illustrates an exemplary method for utilizing object attributes to generate an audio description of the visual objects in video content.

FIG. 7 illustrates a method 700 for generating descriptions of objects. Method 700 can be performed by, for example, server 250 of FIG. 2. Method 700 can provide more detail to, for example, step 630 of FIG. 6, step 410 of FIG. 4, and/or step 310 of FIG. 3. Method 700 can begin at 705 with selecting a frame of the decomposed audio-video content. At 710, the server can select a visual object within the frame. For example, the server can decompose the frame into individual objects and select one of the objects. The server can detect objects that have previously been described in, for example, the previous frame, and not select those objects for description again. At 715, the server can identify a type of the visual object. For example, the server can compare the shape of the object to a library of objects to identify the type of object (e.g., a person, a chair, a house, keys, and so forth). Based on the type of the object, at 720 the server can select an analysis template that defines attributes of the object. At 725, the server can use the analysis template to identify attributes of the object and assign values to the attributes based on the object. For example, an attribute can be color and the color attribute can be assigned a value based on the color of the object in the frame (e.g., if the object is red, the color attribute is assigned the value "red"). Other attributes can include size, relative size, shape, and so forth. Attributes for a person can include, skin color, hair color, eye color, height, weight, and so forth. Attributes for other objects can be different as defined in the analysis template. At 730, the server can determine whether there are additional objects to describe. If so, steps 710, 715, 720, and 725 can be performed until all the objects have been identified and assigned attributes based on the appropriate analysis template. Once all the objects in the frame have been analyzed, at 735 the server can determine whether there are additional frames to analyze. If so, another (e.g., the next) frame can be selected and analyzed. Once all of the frames have been analyzed, step 415 of FIG. 4 can be executed, for example.

Figure 8:
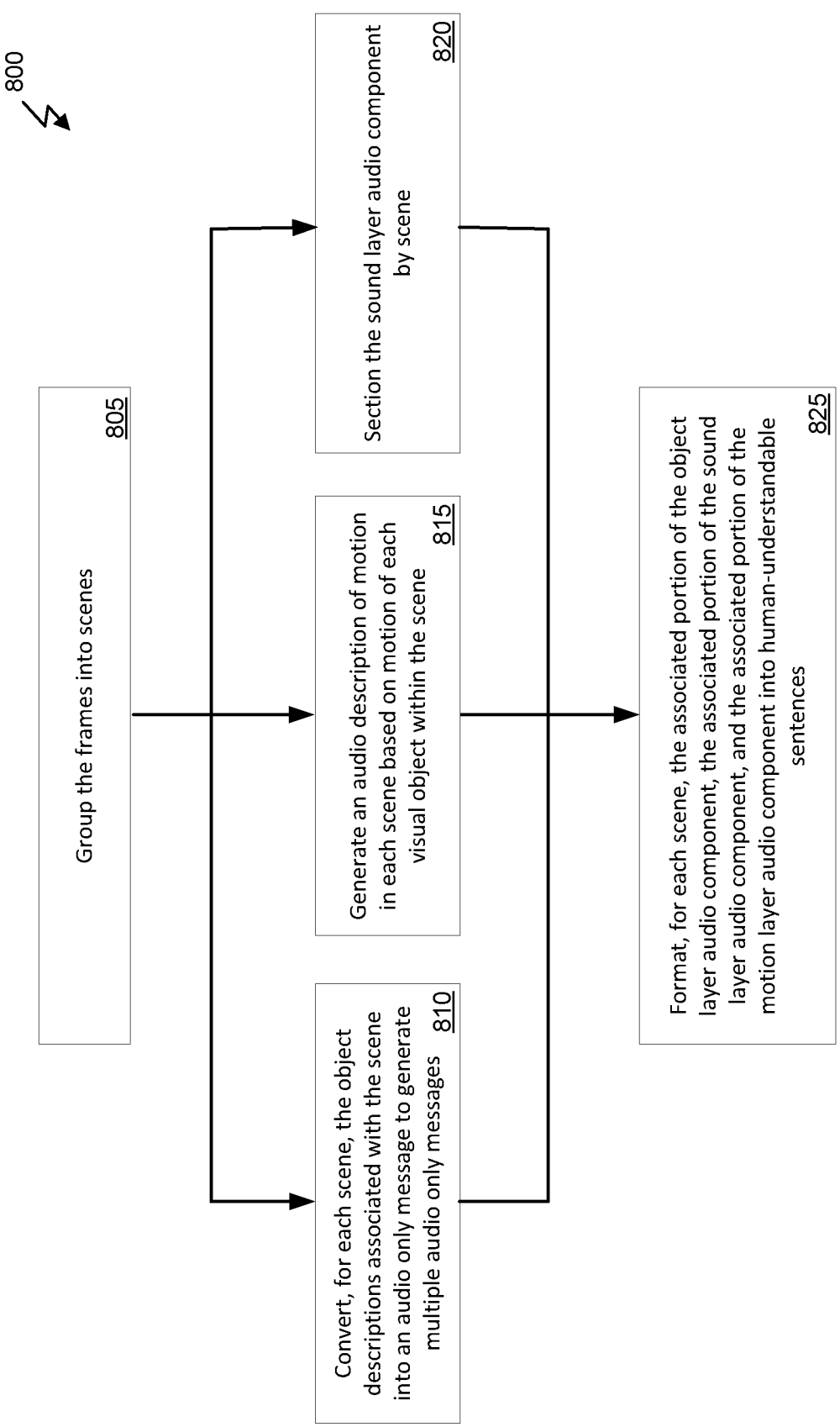
FIG. 8 illustrates an exemplary method for utilizing scenes to generate audio output of audio-video content.

FIG. 8 illustrates a method 800 for generating audio only content by scene. Method 800 can be performed by, for example, server 250 of FIG. 2. Method 800 can be performed in conjunction with any of methods 300, 400, 500, 600, and/or 700. Method 800 can begin at 805 with grouping the frames of the decomposed audio-video content into scenes. The server can, for example, analyze the frames to identify when a threshold number of objects change in the frame from the previous frame to indicate a scene change. The server can additionally, or alternatively, analyze the sound portion of the decomposed audio-video content to identify threshold changes in background sounds, the music that is playing, and/or conversations to identify the scene changes. Steps 810, 815, and 820 can be performed in sequence or in parallel. At 810, the server can convert, for each scene, the object descriptions associated with the scene into an audio only message. For example, any overlapping or redundant descriptions can be removed before the audio only message is generated. At 815, the server can generate an audio description of motion in each scene based on motion of each object within the scene. For example, redundant descriptions of motion, or motion that began and stopped, perhaps due to a change in viewing angle, and then began again can be described only once per scene. At 820, the server can section the sound layer audio component by scene. For example, the sound layer audio component can include speech that may change between scenes, which can be sectioned out. As another example, background music that can change at a change in the scene can be sectioned out. At 825, the server can format each scene into human-understandable sentences based on the associated object layer audio component, sound layer audio component, and motion layer audio component. For example, using natural language processing or a digital video generator, the components can be stitched together based on timestamps in each of the components to create a complete audio only version of the audio-video content that describes objects, motion, and includes the sound component of the audio-video content stitched throughout the audio only content and/or translated and included in the audio only content.

Figure 9:
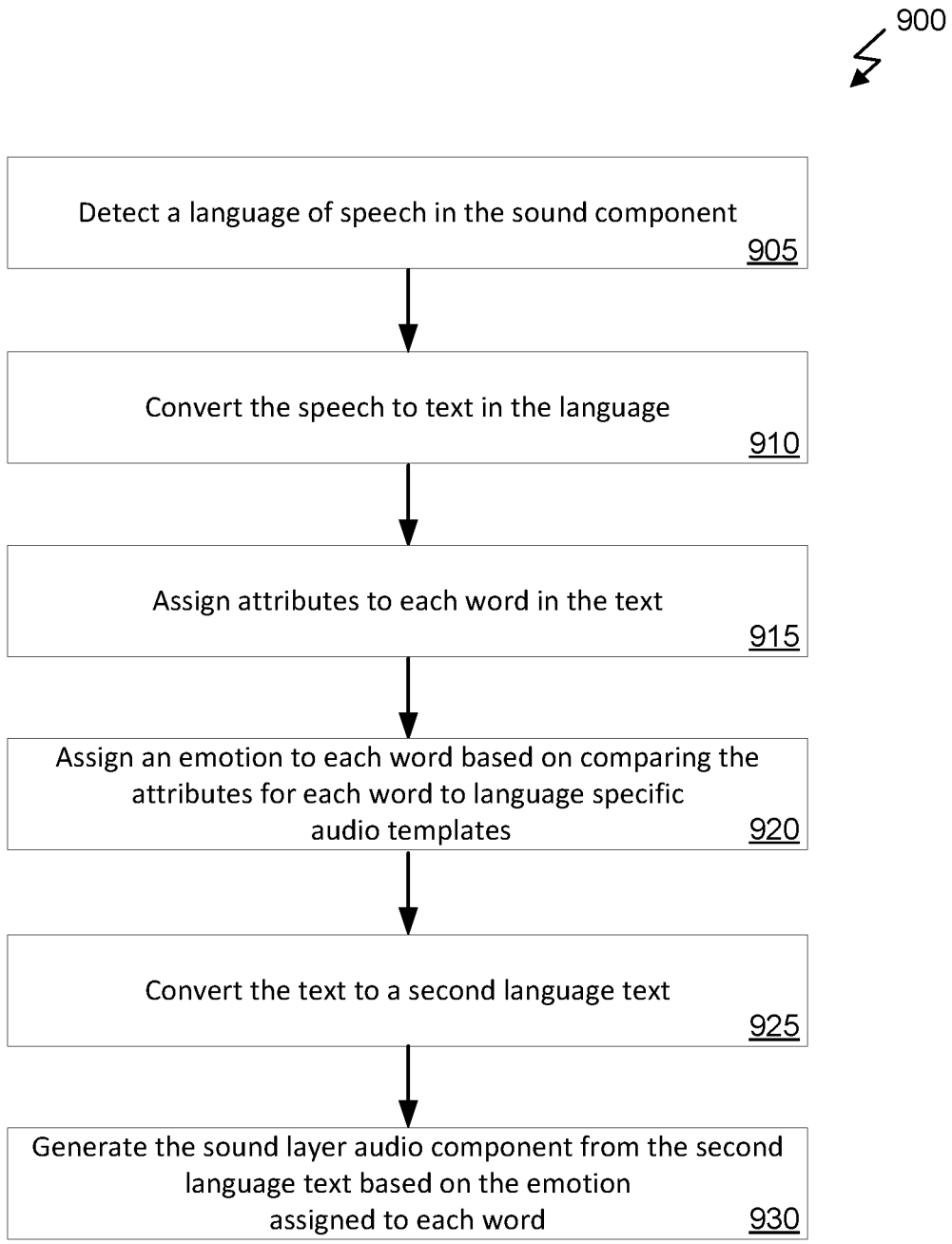
FIG. 9 illustrates an exemplary method for converting the speech in an audio-video content to audio content in a different language.

FIG. 9 illustrates a method 900 for generating a sound layer audio component. Method 900 can be performed by, for example, server 250 of FIG. 2. Method 900 can be more detailed steps performed at step 315 of FIG. 3. Method 900 can begin at 905 with the server detecting a language of speech in the sound component of the decomposed audio-video content. At 910, the server can convert the speech to text in the detected language. At 915, the server can assign attributes to each word in the text. For example, attributes such as tone, speed, duration, and so forth can be given values based on the sound component of the decomposed audio-video content for each word. Language specific audio templates can be used to assign an emotion to each word based on comparing the attributes for each word to the template at step 920. At 925, the server can translate the text to a different language optionally if selected by the user. At 930, the server can generate the sound layer audio component from the translated text or the original text based on the emotion assigned to each word. When maintaining the same language, this conversion can allow the server to stitch the speech portion of the audio-video content with the other descriptions by, for example, separating various sound component portions of the audio-video content into scenes as described in method 800 which can be stitched together based on timestamps.

Figure 10:
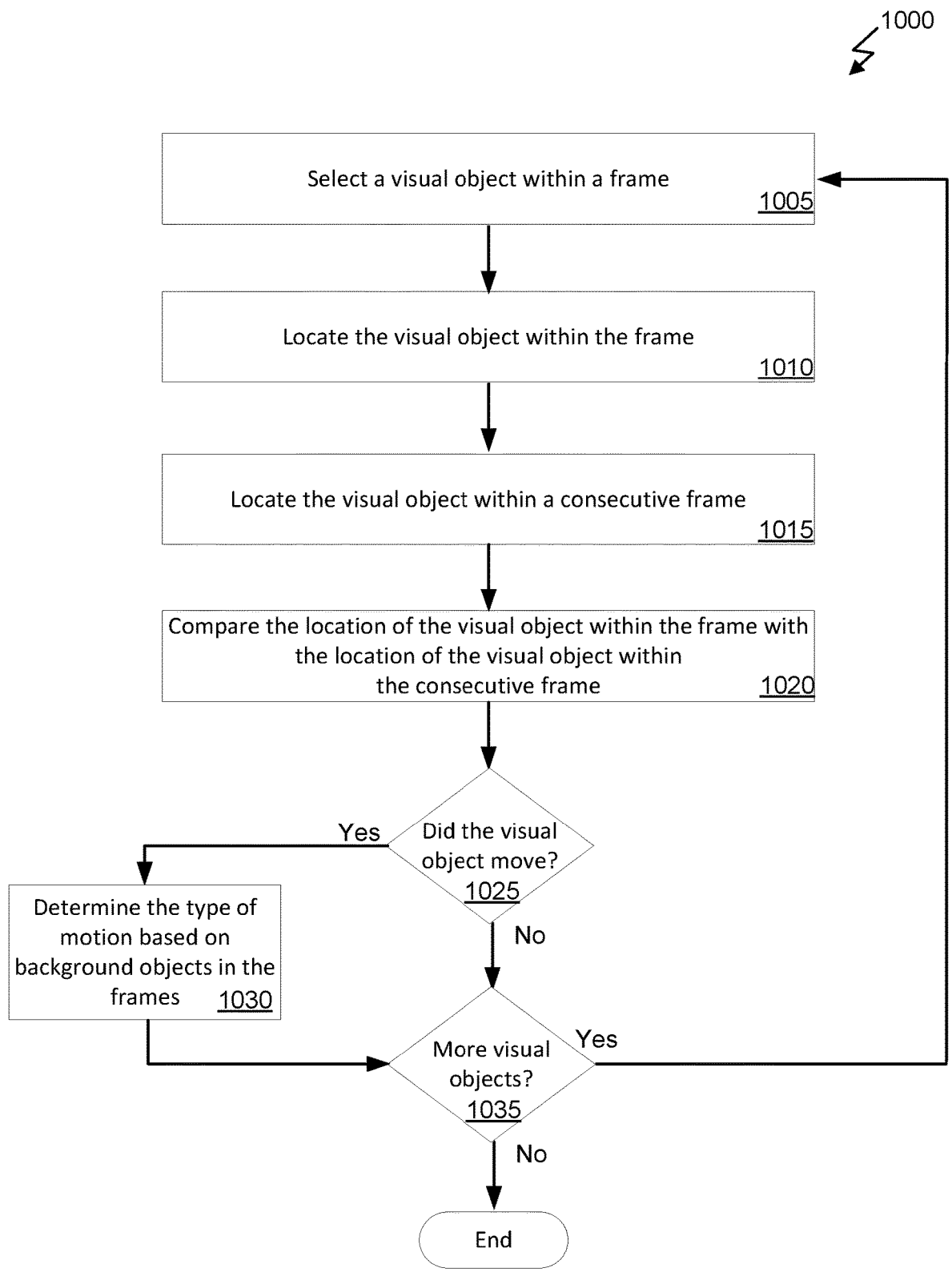
FIG. 10 illustrates an exemplary method for identifying motion and the type of motion of objects between consecutive frames of video content.

FIG. 10 illustrates a method 1000 for identifying motion within the decomposed audio-video content. Method 1000 can be performed by, for example, server 250 of FIG. 2. Method 1000 can be more details of step 320 of FIG. 3, for example. Method 1000 can begin at 1005 with the server selecting an object within a frame. At 1010, the server can locate the object within the frame. For example, a relative location of the object within the frame can be the upper right corner. The frame can be put on an x, y axis, for example, and coordinates can be assigned to the object as another example. At 1015, the server can location the visual object within a consecutive frame. For example, in the first frame, the object can be located in the upper right corner, but in the next frame the object can be slightly lower (such as a ball falling). At 1020, the server can compare the location of the visual object within the frame with the location of the visual object within the consecutive frame. At 1025, the server can determine if the object moved. If it did, the server can determine at 1030 the type of motion based on background object in the frames. For example, if background objects did not move, but the analyzed object did move, that can indicate that it was object movement. As another example, if background objects moved similarly to the analyzed object, that can indicate camera movement. As yet another example, if background objects completely changed between the frames, that can indicate editing movement (e.g., a different camera perspective of the same scene). At 1035, the server can determine if additional objects need to be analyzed within the frame. If so, steps 1005, 1010, 1015, 1020, 1025, and 1030 can be completed until no additional objects need to be analyzed.

FIG. 11 illustrates an embodiment of a computer system 1100. A computer system 1100 as illustrated in FIG. 11 may be incorporated into devices such as a television receiver, DVR, television, media system, personal computer, smartphone, tablet, and the like. FIG. 11 provides a schematic illustration of one embodiment of a computer system 1100 that can perform some or all of the steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105, or may otherwise be in communication, as appropriate. The hardware elements may include one or more processors 1110 (e.g., processor 152 and processor 194 of FIG. 1), including without limitation one or more general-purpose processors and/or one or more special-purpose processors such as digital signal processing chips, graphics acceleration processors, and/or the like; one or more input devices 1115, which can include without limitation a mouse, a keyboard, a camera, a remote control, and/or the like; and one or more output devices 1120, which can include without limitation a display device, a printer, and/or the like.

The computer system 1100 may further include and/or be in communication with one or more non-transitory computer-readable storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 1130 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1130. In other embodiments, a portable electronic device may be incorporated into the computer system 1100 as an input device 1115. In many embodiments, the computer system 1100 will further comprise a working memory 1135, which can include a RAM or ROM device, as described above.

The computer system 1100 also can include software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 9 and 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1100 to perform methods in accordance with various embodiments of the technology. According to a set of embodiments, some or all of the procedures of such methods are performed by the computer system 1100 in response to processor 1110 executing one or more sequences of one or more instructions, which might be incorporated into the operating system 1140 and/or other code, such as an application program 1145, contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Described throughout has been methods and systems for converting audio-video content into audio only content. Additionally, other forms of content can be converted to audio-only content. For example, audio only content and/or text only content can be converted using the techniques above to generate audio only content. For example, audio only content can be translated to a different language to provide converted audio only content. Text only content has the same problem as audio-video content in that the content needs to be consumed visually. When driving, for example, the user cannot (and should not) be reading text content.

Audio only content can be converted using functionality that can be performed by the systems described above. The audio only content can be obtained, for example, by server 250 of FIG. 2. The server can detect the language of the spoken portions (i.e., speech) of the audio only content. The speech can be converted to text in the same language. Using audio recognition, attributes can be assigned to every word. Take as an example, "I love that movie" spoken in audio only content. The word "love" can be described with attributes such as speed/duration, volume, pitch, sound channels (left, right), and so forth. Audio templates can use the attributes to determine an emotion associated with the word and assign the emotion to the word. The text can be translated to a different language and the assigned attributes and emotions can be linked to the translated text. In the above example, the attributes and emotion assigned to "love" is then assigned to "amo" in the Spanish translated text. A natural language generator or digital voice generator can be used to convert the text to audio using the emotions and attributes assigned to each word.

Text only content can also be converted using functionality that can be performed by the systems described above. The text only content can be obtained, for example, by server 250 of FIG. 2. In addition to the text, other information can be provided. For example, while the user is typing the text message (for example the camera on a smartphone can capture video of the typist while the typist is typing the text message). Additionally, the captured video can be correlated with timestamps to match the words that were being typed so that the facial expressions associated with various typed words are correlated. The server can detect the language of the text. The server can also use spatial recognition on the video and assign attributes to every word. For example, if the user types "I love that movie" and smiles when the typist types "love," a smile attribute can be assigned to "love." The attributes can be used to assign an emotion to words using language specific text templates. If desired, the text can be translated to another language. Any attributes can be lined to the translated text. A natural language generator or digital voice generator can be used to convert the text to audio using the emotions and attributes assigned to each word.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 and/or components thereof generally will receive signals, and the bus 1105 then might carry the signals and/or the data, instructions, etc. carried by the signals to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for converting audio-video content into audio-only content, the method comprising:
   receiving a request for audio-video content by a computer system from a device of a user;
   determining whether an audio-only version is available for the audio-video content;
   responsive to the request and responsive to determining that no audio-only version is available for the audio-video content, dynamically generating the audio-only version of the audio-video content by:
   decomposing the audio-video content into a plurality of frames;
   creating an object layer for the audio-video content by, for each frame, analyzing the frame to identify one or more visual objects in the frame;
   creating a motion layer for the audio-video content by analyzing the plurality of frames and the one or more visual objects identified in the plurality of frames to detect motion of at least a portion of the one or more visual objects over the plurality of frames, and by automatically generating a description of the motion of the at least a portion of the one or more visual objects;
   creating a sound layer for the audio-video content by automatically converting the description of the motion of the at least a portion of the one or more visual objects into one or more audio components; and generating an audio only output of the audio-video content automatically from the one or more audio components; and transmitting, by the computer system, the audio only output to the device of the user responsive to the request.

2. The method for converting audio-video content into audio-only content of claim 1, wherein the decomposing further comprises:

decomposing the audio-video content into a sound component, wherein generating the audio only output further comprises mixing the one or more audio components with the sound component.

3. The method for converting audio-video content into audio-only content of claim 1, wherein the creating the object layer further comprises:

automatically generating a plurality of descriptions of the one or more visual objects.

4. The method for converting audio-video content into audio-only content of claim 3, wherein the creating the object layer further comprises:

generating an object layer audio component based on the plurality of descriptions of the one or more visual objects, wherein the audio only output is generated automatically further from the object layer audio component.

5. The method for converting audio-video content into audio-only content of claim 1, wherein the creating the object layer further comprises:

grouping the plurality of frames into a plurality of scenes; and for each scene:
automatically generating a plurality of descriptions of the one or more visual objects associated with the scene;
converting the plurality of descriptions associated with the scene into an audio only message; and
generating an object layer audio component from the audio only message, wherein the audio only output is generated automatically further from the object layer audio component.

6. The method for converting audio-video content into audio-only content of claim 1, wherein the creating the motion layer further comprises:

generating a motion layer audio component based on the description of the motion of the at least a portion of the one or more visual objects, wherein the one or more audio components comprise the motion layer audio component.

7. The method for converting audio-video content into audio-only content of claim 1, wherein creating the object layer further comprises:

identifying the one or more visual objects using a catalog of object templates.

8. The method for converting audio-video content into audio-only content of claim 1, wherein creating the object layer further comprises, for each frame:

automatically categorizing each of the one or more visual objects in the frame as focal point objects and background objects by analyzing a relative acuteness of each of the one or more visual objects in the frame, such that each of the one or more visual objects in the frame having a relative acuteness above a predetermined threshold is categorized as a focal point object, and each of the one or more visual objects in the frame having a relative acuteness below the predetermined threshold is categorized as a background object, wherein the automatically generating the description comprises automatically generating a more detailed description of focal point objects than of background objects.

9. The method for converting audio-video content into audio-only content of claim 8, wherein the creating the motion layer comprises:

automatically determining a type of the motion based on comparing motion over the plurality of frames between the focal point objects and the background objects, wherein the automatically generating the description of the motion is descriptive of the type of the motion.

10. The method for converting audio-video content into audio-only content of claim 1, further comprising:

detecting, during playback of the audio-video content via the device of the user, a change in a status of the device of the user predetermined to trigger a change in playback from an audio-video version of the audio-video content to the audio-only version of the audio-video content, wherein the receiving the request is automatically responsive to the detecting the change in status.

11. The method for converting audio-video content into audio-only content of claim 1, wherein the detecting the change in status comprises:

detecting that the device of the user is in motion for at least one of a threshold period of time or a threshold distance.

12. A system for converting audio-video content into audio-only content, the system comprising:

a processor; and a memory having stored thereon instructions that, when executed by the processor, cause the processor to:
receive a request for audio-video content by a computer system from a device of a user;
determine whether an audio-only version is available for the audio-video content;
responsive to the request and responsive to determining that no audio-only version is available for the audio-video content, dynamically generate the audio-only version of the audio-video content by:
decomposing the audio-video content into a plurality of frames;
creating an object layer for the audio-video content by, for each frame, analyzing the frame to identify one or more visual objects in the frame;
creating a motion layer for the audio-video content by analyzing the plurality of frames and the one or more visual objects identified in the plurality of frames to detect motion of at least a portion of the one or more visual objects over the plurality of frames, and by automatically generating a description of the motion of the at least a portion of the one or more visual objects;
creating a sound layer for the audio-video content by automatically converting the description of the motion of the at least a portion of the one or more visual objects into one or more audio components; and
generating an audio only output of the audio-video content automatically from the one or more audio components; and transmitting the audio only output to the device of the user responsive to the request.

13. The system for converting audio-video content into audio-only content of claim 12, wherein the instructions that cause the processor to decompose further comprise instructions that cause the processor to:
    decompose the audio-video content into a sound component,
    wherein generating the audio only output further comprises mixing the one or more audio components with the sound component.

14. The system for converting audio-video content into audio-only content of claim 12, wherein the instructions that cause the processor to create the object layer further comprise instructions that cause the processor to:
    automatically generate a plurality of descriptions of the one or more visual objects.

15. The system for converting audio-video content into audio-only content of claim 14, wherein the instructions that cause the processor to create the object layer further comprise instructions that cause the processor to:
    generate an object layer audio component based on the plurality of descriptions of the one or more visual objects,
    wherein the audio only output is generated automatically further from the object layer audio component.

16. The system for converting audio-video content into audio-only content of claim 12, wherein the instructions that cause the processor to create the object layer further comprise instructions that cause the processor to:
    group the plurality of frames into a plurality of scenes; and
    for each scene:
        automatically generate a plurality of descriptions of the one or more visual objects associated with the scene;
        convert the plurality of descriptions associated with the scene into an audio only message; and
        generate an object layer audio component from the audio only message,
        wherein the audio only output is generated automatically further from the object layer audio component.

17. The system for converting audio-video content into audio-only content of claim 12, wherein the instructions that cause the processor to create the motion layer further comprise instructions that cause the processor to:
    generate a motion layer audio component based on the description of the motion of the at least a portion of the one or more visual objects,
    wherein the one or more audio components comprise the motion layer audio component.

18. The system for converting audio-video content into audio-only content of claim 12, wherein:
    the instructions that cause the processor to create the object layer further comprise instructions that cause the processor to, for each frame, automatically categorize each of the one or more visual objects in the frame as focal point objects and background objects by analyzing a relative acuteness of each of the one or more visual objects in the frame, such that each of the one or more visual objects in the frame having a relative acuteness above a predetermined threshold is categorized as a focal point object, and each of the one or more visual objects in the frame having a relative acuteness below the predetermined threshold is categorized as a background object; and
    the instructions that cause the processor to automatically generate the description further comprise instructions that cause the processor to automatically generate a more detailed description of focal point objects than of background objects.

19. The system for converting audio-video content into audio-only content of claim 12, wherein:
    the instructions that cause the processor to create the motion layer further comprise instructions that cause the processor automatically to determine a type of the motion based on comparing motion over the plurality of frames between the focal point objects and the background objects; and
    the instructions that cause the processor to automatically generate the description further comprise instructions that cause the processor to automatically generate the description of the motion to be descriptive of the type of the motion.

20. The system for converting audio-video content into audio-only content of claim 12, wherein the instructions cause the processor further to:
    detect, during playback of the audio-video content via the device of the user, a change in a status of the device of the user predetermined to trigger a change in playback from an audio-video version of the audio-video content to the audio-only version of the audio-video content,
    wherein the request is received automatically responsive to the detecting the change in status.

* * * * *